B. F. PLATT.
Cotton-Press.

No. 168,668.  Patented Oct. 11, 1875.

WITNESSES:
C. Neveux
Alex F. Roberts

INVENTOR:
B. F. Platt
BY
Munn & Co
ATTORNEYS.

UNITED STATES PATENT OFFICE.

BENJAMIN F. PLATT, OF VIENNA, LOUISIANA.

IMPROVEMENT IN COTTON-PRESSES.

Specification forming part of Letters Patent No. 168,668, dated October 11, 1875; application filed August 14, 1875.

*To all whom it may concern:*

Be it known that I, BENJAMIN F. PLATT, of Vienna, Lincoln parish, Louisiana, have invented a new and Improved Cotton-Press, of which the following is a specification:

The invention will first be described in connection with drawing, and then pointed out in the claim.

The contrivance affords a very simple and inexpensive plan for applying hand or horse power to work the press.

Figure 1:
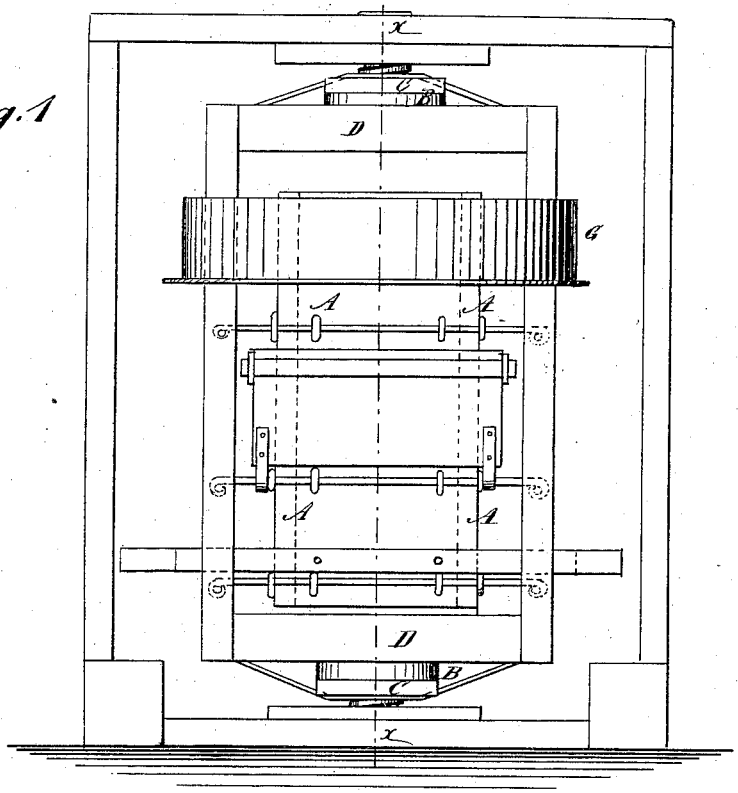
Figure 2:
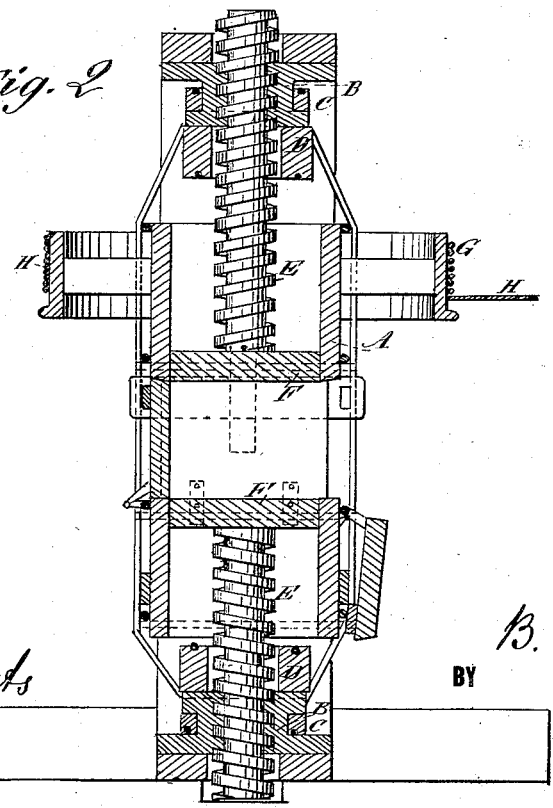

Figure 1 is a side elevation of my improved press, and Fig. 2 is a sectional elevation on the line $x\,x$.

Similar letters of reference indicate corresponding parts.

A is the press-case, which is arranged upright, and so as to revolve on the stationary pivots B, by the collars or bearings C D. In each stationary pivot, which is screw-threaded, is a powerful screw, E, having for its head one of the press-followers F, which, being revolved by the press-case, revolves the screw, and screws it up or down, according to which way the case is turned, the case being turned by levers, or by a band-wheel, G, the power being applied by a rope, H, wound on it, and pulled off by a horse; or band driven by any other power may be used.

The screws are right and left handed, so that they move the followers in opposite directions at the same time, as required, for extending and contracting the press.

I am aware that screws having followers that are worked toward one another by a revolving press-box are not new; but

What I claim is—

The combination, with screws E, having followers at the end, and working in nuts B, of a press-box, A, rigidly fastened within a rotary wheel, G, as and for the purpose specified.

BENJAMIN F. PLATT.

Witnesses:
H. C. STATEN,
J. T. WALKER.